United States Patent
Piao et al.

(10) Patent No.: US 6,786,059 B1
(45) Date of Patent: Sep. 7, 2004

(54) REFRIGERATION SYSTEM

(75) Inventors: Chun-cheng Piao, Osaka (JP); Manabu Yoshimi, Osaka (JP); Ryuichi Sakamoto, Osaka (JP); Yuji Watanabe, Osaka (JP); Kazuo Yonemoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/069,869

(22) PCT Filed: Aug. 31, 2000

(86) PCT No.: PCT/JP00/05905

§ 371 (c)(1),
(2), (4) Date: Mar. 1, 2002

(87) PCT Pub. No.: WO01/18465

PCT Pub. Date: Mar. 15, 2001

(30) Foreign Application Priority Data

Sep. 3, 1999 (JP) ............................................ 11/249697

(51) Int. Cl.[7] .................................................. F25B 27/00

(52) U.S. Cl. ..................... 62/236; 62/434; 62/238.3; 62/467; 62/148; 62/124

(58) Field of Search ............................... 62/434, 238.3, 62/236, 467, 148, 124

(56) References Cited

U.S. PATENT DOCUMENTS

| | | | |
|---|---|---|---|
| 2,130,549 A | | 9/1938 | Kirgan et al. |
| 2,860,493 A | | 11/1958 | Capps et al. |
| 4,530,705 A | * | 7/1985 | Firey .......................... 55/162 |
| 5,203,161 A | * | 4/1993 | Lehto ........................ 60/39.53 |
| 5,209,078 A | | 5/1993 | Conrad et al. |
| 6,050,083 A | * | 4/2000 | Meckler .................. 60/39.182 |

FOREIGN PATENT DOCUMENTS

| | | |
|---|---|---|
| CH | 221241 | 9/1942 |
| DE | 373 915 | 4/1923 |
| DE | 36 24 352 A1 | 1/1988 |
| DE | 42 36 459 A1 | 5/1993 |
| DE | 195 45 335 A1 | 6/1997 |
| DE | 197 57 769 A1 | 12/1997 |
| EP | 0 532 368 A2 | 9/1992 |
| FR | 700858 | 11/1929 |
| JP | 57-122109 | 7/1982 |
| JP | 58011083 | 1/1983 |
| JP | 58-050213 | 11/1983 |
| JP | 59-047221 | 11/1984 |
| JP | 61-087908 | 5/1986 |
| JP | 62-022966 | 1/1987 |
| JP | 62-223573 | 10/1987 |
| JP | 62-273028 | 11/1987 |
| JP | 04-121535 | 4/1992 |
| JP | 05-006105 | 1/1993 |
| JP | 06-257890 | 9/1994 |
| JP | 07-043039 | 2/1995 |
| JP | 07-066829 | 7/1995 |
| JP | 10-141801 | 5/1998 |
| JP | 10-185350 | 7/1998 |
| JP | 11-218371 | 10/1998 |
| JP | 05-066078 | 3/1999 |

(List continued on next page.)

*Primary Examiner*—William C. Doerrler
*Assistant Examiner*—Mark Shulman
(74) *Attorney, Agent, or Firm*—Nixon Peabody LLP; Donald R. Studebaker

(57) ABSTRACT

Water is used as a refrigerant, and a humidification cooler (41) which evaporates the water to generate cold heat and a dehumidifier (42) are provided. A compressor (50) which compresses water vapor separated by the dehumidifier (42) is provided. A moisture discharging device (60) which discharges water vapor compressed in the compressor (50) is provided. The compressor (50) is driven by a steam turbine (80) capable of generating rotational power from thermal energy.

16 Claims, 8 Drawing Sheets

FOREIGN PATENT DOCUMENTS

| | | |
|---|---|---|
| JP | 11-083077 | 3/1999 |
| JP | 11218371 | 8/1999 |
| JP | 11-252763 | 9/1999 |
| WO | WO 98/43023 | 10/1998 |

* cited by examiner

REFRIGERATION SYSTEM

TECHNICAL FIELD

The present invention relates to refrigeration systems, and in particular to improvements in refrigeration systems of the type in which water is directly evaporated to generate cold heat.

BACKGROUND ART

In some of refrigeration systems of such a type, as disclosed in Japanese Patent Kokoku Publication No. H05-6105, the evaporator is depressurized by the compressor, and water present in the evaporator is caused to evaporate so that a target for cooling is cooled.

Further, in some other type of refrigeration system, as disclosed in Japanese Patent Kokai Publication No. H07-43039, a water solution of ammonia is used as a refrigerant and an evaporator provided with a moisture permeable membrane is disposed. The evaporator of this refrigeration system is divided into a depressurization space and a refrigerant passageway, and a part of the refrigerant evaporates and passes through the moisture permeable membrane from the refrigerant passageway, going into the depressurization space. This generates a refrigerant which is cold heat. A target for cooling is cooled by this refrigerant in the heat exchanger, and meanwhile, refrigerant gas separated in the evaporator is compressed by the compressor. Thereafter, the refrigerant from the heat exchanger, after absorbing the compressed refrigerant gas in the absorber, is brought back again to the evaporator. Then, such an operation is repeatedly carried out.

Problems that the Invention Intends to Solve

In the above-described conventional refrigeration system (Japanese Patent Kokai Publication No. H06-257890), in order to directly evaporate water, it is necessary to drive the compressor to compress water vapor from a saturation vapor pressure at an evaporating temperature up to a saturation vapor pressure at a condensation temperature.

However, the input of the compressor is not taken into consideration at all, and generally compressors are driven by electric motor. That is, compressors are driven by electrical energy alone, therefore producing the problem that there is a limit to the improvement in efficiency.

On the other hand, the above-described refrigeration system making utilization of a water solution of ammonia or the like (as disclosed in Japanese Patent Kokai Publication No. H07-43039) also produces some problems. One problem is that the operating temperature and the operating pressure of the system are limited by the properties of the water solution such as corrosiveness. Another problem is that there is a limitation that the use of a special material is required.

Bearing in mind the above-described problems with the prior art techniques, the present invention was made. Accordingly, an object of the present invention is to generate cold heat by evaporating water at high efficiency.

DISCLOSURE OF THE INVENTION

Summary of the Invention

In the present invention, the pressure increasing means makes use of thermal energy as its input.

Means of Solving the Problems

More specifically, as shown in FIG. 1, the present invention discloses a refrigeration system in which water is evaporated to generate cold heat and water vapor produced is increased in pressure by pressure increasing means (50) and then discharged, and the pressure increasing means (50) is driven at least by mechanical power derived from thermal energy.

Further, the refrigeration system of the present invention may include: a cold heat generating means (40) in which water serves as a refrigerant; the water is evaporated to generate cold heat; and water vapor produced is drawn into the pressure increasing means (50); a moisture discharging means (60) for discharging water vapor increased in pressure by the pressure increasing means (50); and a prime mover (80) for generating mechanical power from thermal energy to drive the pressure increasing means (50).

Further, the refrigeration system of the present invention may further include an electric motor (52) which generates mechanical power from electrical energy to drive the pressure increasing means (50) together with the prime mover (80).

Further, in the refrigeration system of the present invention, the prime mover (80) may be a steam turbine (80).

Further, in the refrigeration system of the present invention, the steam turbine (80) may utilize an excess of water vapor.

Further, the refrigeration system of the present invention may further include a boiler (81) which utilizes waste heat to generate a supply of water vapor to the steam turbine (80).

Further, the refrigeration system of the present invention may further include: a boiler (81) which utilizes waste heat to generate a supply of water vapor to the steam turbine (80); and a superheating means which superheats water vapor generated in the boiler (81).

Further, in the refrigeration system of the present invention, the pressure of the boiler (81) may be set below atmospheric pressure.

Further, in the refrigeration system of the present invention, water vapor discharged from the steam turbine (80) is mixed with water vapor discharged from the pressure increasing means (50) and then discharged from the moisture discharging means (60).

Further, in the refrigeration system of the present invention, sensible heat produced in the pressure increasing means (50) may be collected and the collected heat is utilized to generate a supply of water vapor to the steam turbine (80) or to superheat water vapor.

Further, in the refrigeration system of the present invention, the moisture discharging means (60) may include a water vapor permeable membrane (61) allowing water vapor to pass therethrough so that water vapor can be discharged into the atmospheric air because of a difference in water vapor pressure created between partition spaces divided by the water vapor permeable membrane (61).

Further, in the refrigeration system of the present invention, the cold heat generating means (40) may include: a humidification cooler (41) which supplies water to air to be conditioned so that the air is cooled; and a dehumidifier (42) which dehumidifies the air cooled by the humidification cooler (41).

Further, in the refrigeration system of the present invention, the cold heat generating means (40) may include: a dehumidifier (42) which dehumidifies air to be conditioned; and a humidification cooler (41) which supplies water to the air dehumidified by the dehumidifier (42) so that the air is cooled.

Further, in the refrigeration system of the present invention, the dehumidifier (42) may include a water vapor permeable membrane (4b) allowing water vapor to pass therethrough so that water vapor can be removed because of a difference in water vapor pressure created between partition spaces divided by the water vapor permeable membrane (4b).

Further, in the refrigeration system of the present invention, the cold heat generating means (40) may directly spray air to be conditioned with water so that the to-be-conditioned air is cooled.

Further, in the refrigeration system of the present invention, the humidification cooler (41) may include a moisture permeable membrane allowing water vapor to pass therethrough so that water evaporates and then passes through the moisture permeable membrane to humidify and cool air.

Further, in the refrigeration system of the present invention, the cold heat generating means (40) may include an evaporation cooler (43) which supplies cold heat generated by water evaporation to air to be conditioned so that the to-be-conditioned air is cooled.

Further, in the refrigeration system of the present invention, the cold heat generating means (40) may include an evaporation cooler (43) which generates cooling water by water evaporation.

Further, in the refrigeration system of the present invention, the cold heat generating means (40) may include an evaporation cooler (43) which generates ice by water evaporation.

Further, in the refrigeration system of the present invention, the evaporation cooler (43) may cause water to undergo direct evaporation in a low pressure space.

Further, in the refrigeration system of the present invention, the evaporation cooler (43) may include a moisture permeable membrane (4f) allowing water vapor to pass therethrough so that water evaporates and passes through the moisture permeable membrane (4f) to a low pressure space.

Further, the refrigeration system of the present invention may further include a humidity controlling means (73) which controls the humidity of outside air whose moisture content is discharged by the moisture discharging means (60).

Further, in the refrigeration system of the present invention, the humidity controlling means (73) may include a heat exchanger (7b) which increases the temperature of outside air by utilizing waste heat.

That is, in the boiler (81) of the present invention, high temperature water vapor is generated by heating water. This high temperature water vapor is supplied to the steam turbine (80). The steam turbine (80) which is a prime mover generates rotational power by expansion of the water vapor.

The pressure increasing means (50) is driven by the rotational power generated by the steam turbine (80). The pressure increasing means (50) may be driven both by output from the steam turbine (80) and by output from the electric motor (52).

On the other hand, in the cold heat generating means (40), cold heat is generated by evaporating water for the cooling of air. More specifically, for example, indoor air flows into the humidification cooler (41) and, at the same time, water is supplied to the humidification cooler (41), so that the air is sprayed with the water. The air is cooled when the water undergoes evaporation and changes to saturated air.

This saturated air flows in a dehumidification space of the dehumidifier (42). Since the pressure increasing means (50) is being driven, a low pressure space is formed through the water vapor permeable membrane (4b) in the dehumidifier (42). The water vapor pressure of this low pressure space is lower than the water vapor pressure of the dehumidification space on the other side, so that water vapor contained in the saturated air passes through the water vapor permeable membrane (4b) and migrates to the low pressure space. As a result, the saturated air is dehumidified, thereby generating temperature- and humidity-conditioned air. This conditioned air is supplied indoors for providing cooling.

Meanwhile, water vapor, which has been separated in the moisture discharging device (60), is drawn into the pressure increasing means (50) where the water vapor is compressed to an increased pressure. This increased-pressure water vapor flows in the moisture discharging means (60). At that time, the water vapor is mixed with water vapor discharged from the steam turbine (80) and flows into the moisture discharging means (60).

For example, outside air flows into the moisture discharging means (60). Since the water vapor pressure of a high pressure space of the moisture discharging device (60) is higher than the water vapor pressure of a moisture discharge space on the other side thereof, water vapor passes through the water vapor permeable membrane (4b) and migrates into the moisture discharge space. As a result, both water vapor from the pressure increasing means (50) and water vapor from the steam turbine (80) are discharged into the outside air. This water vapor cycle is repeatedly carried out so that the room is cooled. The steam turbine (80) may expel water vapor into the atmospheric air.

Further, in another invention, outside air whose moisture content has been discharged by the moisture discharging means (60) is dehumidified in the humidity controlling means (73). Especially, outside air whose moisture content has been discharged is heated in the heat exchanger (7b), and a solid or liquid adsorbent of the humidity controlling means (73) is regenerated by the heated outside air. At that time, as the heat that is supplied to the heat exchanger (7b), a variety of heats such as fuel cell waste heat may be utilized.

Furthermore, in the cold heat generating means (40), air may be dehumidified in the dehumidifier (42) and thereafter cooled by being sprayed with water in the humidification cooler (41). Further, the cold heat generating means (40) may generate, in addition to cooling air, cooling water or ice.

Additionally, the humidification cooler (41) and the evaporation cooler (43) may be constructed so that water is evaporated and passes through the moisture permeable membrane (4f).

Further, an excess of water vapor produced in a factory or the like may serve as water vapor that is supplied to the steam turbine (80). Furthermore, the boiler (81) may utilize various types of waste heats to generate high temperature water vapor.

Furthermore, various types of waste heats may be utilized for the generation of water vapor (for latent heat) in the boiler (81) and the following superheating of water vapor (for sensible heat) may be carried out by gas combustion and an electric heater, or by a superheating means such as pyrogenetic reaction.

Further, sensible heat of high temperature water vapor discharged from the pressure increasing means (50) may be collected and utilized for the generation of water vapor that is supplied to the steam turbine (80) or for the superheating of water vapor.

Effects of the Invention

In accordance with the present invention, thermal energy is utilized to actuate the pressure increasing means (50). This makes it possible to make utilization of various types of energies to drive the pressure increasing means (50), thereby improving energy efficiency.

Further, cold heat is obtained by evaporation latent heat of water, thereby making it possible to perform air conditioning or the like without causing environmental problems.

Furthermore, if an excess of water vapor produced in a factory is supplied to the steam turbine (80), this improves efficiency to a further extent.

Further, if the boiler (81) makes utilization of a variety of waste heats to generate high temperature water vapor, this makes it possible to utilize fuel cell waste heat, and as a result it is possible to further improve efficiency.

Further, if various types of waste heats can be utilized for the generation of high temperature water vapor in the boiler (81) and the following superheating of water vapor is carried out by another superheating means, this makes it possible to achieve the improvement in COP because the amount of heat for sensible heat is small.

Further, if water vapor in the steam turbine (80) is discharged into the atmospheric air, this makes it possible to simplify the arrangement of the whole system.

Furthermore, if sensible heat of high temperature water vapor discharged out of the pressure increasing means (50) is collected and utilized to generate water vapor that is supplied to the steam turbine (80) or to superheat water vapor, this heat collection makes it possible to further improve efficiency.

Further, if water vapor from the pressure increasing means (50) is discharged through the water vapor permeable membrane (4b) of the moisture discharging means (60), then the pressure increasing means (50) is just required to increase the pressure of discharging water vapor above the water vapor pressure of outside air, and the amount of increasing pressure can be made smaller in comparison with cases where water is caused to condense. As a result, it becomes possible to reduce the input of the pressure increasing means (50). At the same time, it is possible to increase the expansion ratio of the steam turbine (80), thereby making it possible to improve the output of the steam turbine (80).

Furthermore, if the moisture discharging means (60) discharges water vapor from the steam turbine (80) through the water vapor permeable membrane (4b), this makes it possible to increase the expansion ratio, and the pressure increasing means (50) can be driven with a less amount of water vapor.

Further, if the cold heat generating means (40) is made up of the humidification cooler (41) and the dehumidifier (42), this makes it possible to separately control the temperature and the humidity of air to be conditioned, and it becomes possible to generate accurately conditioned air.

Furthermore, if the dehumidifier (42) includes the water vapor permeable membrane (4b), it is only required that the suction pressure of the pressure increasing means (50) be made lower than the water vapor pressure of air. This makes it possible to reduce the input of the pressure increasing means (50).

Further, if the humidification cooler (41) includes a moisture permeable membrane, this makes it possible to prevent the occurrence of scale or the like.

Furthermore, if the cold heat generating means (40) supplies cold heat to air to cool it, this prevents the air from being mixed with water, and this arrangement can be applied also in cases where strict moisture control is essential.

Further, if the cold heat generating means (40) generates cooling water, this makes it possible to construct a high-efficiency chiller type refrigeration system.

Furthermore, if the cold heat generating means (40) generates ice, this makes it possible to construct a high-efficiency ice machine.

Further, if the evaporation cooler (43) evaporates water through the moisture permeable membrane (4f), this makes it possible to prevent scale from flowing into the pressure increasing means (50).

Furthermore, if outside air that is introduced into the moisture discharging means (60) is dehumidified in the humidity controlling means (73), this makes it possible to reduce the water vapor pressure of the outside air, and the input of the pressure increasing means (50) can be reduced to a further extent. As a result, it becomes possible to further improve efficiency.

Further, if various types of waste heats can be utilized in the heat exchanger (7b) of the humidity controlling means (73), this makes it possible to make effective utilization of energy.

BEST MODE FOR CARRYING OUT THE INVENTION

Referring to the accompanying drawings, exemplary embodiments of the present invention will be described below.

Embodiment 1

Figure 1:
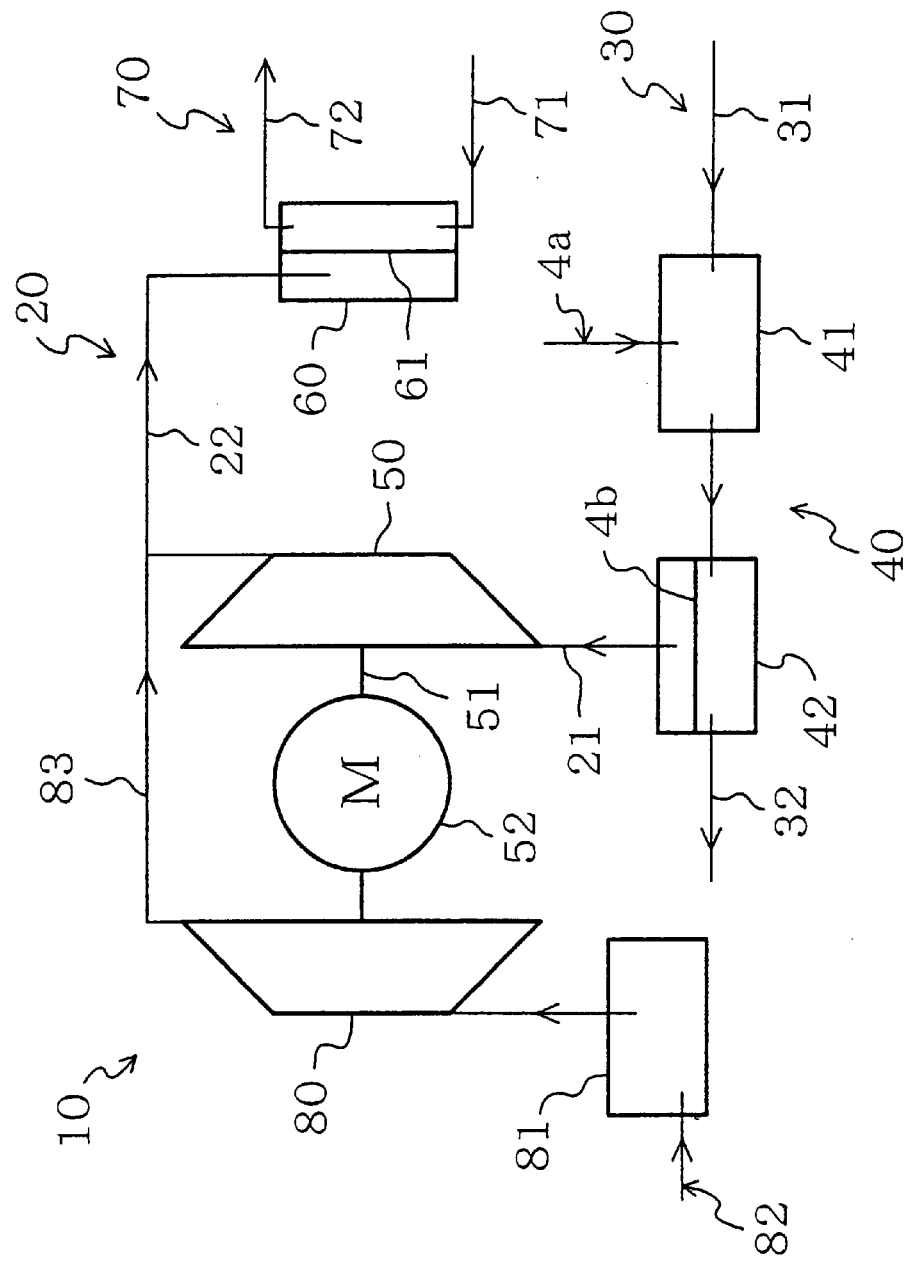
FIG. 1 is a schematic arrangement diagram showing a refrigeration system according to a first embodiment of the present invention.

As shown in FIG. 1, a refrigeration system (10) of the present embodiment is constructed in the form of an air conditioning system in which water is directly evaporated to generate cold heat for providing room cooling.

The refrigeration system (10) includes a water vapor system (20) which is a so-called water vapor cycle for generating cold heat, and a utilization system (30) which utilizes cold heat.

The water vapor system (20) includes a cold heat generating means (40), a compressor (50), and a moisture discharging device (60). On the other hand, the utilization system (30) includes a return air passageway (31) and a supply air passageway (32). The utilization system (30) supplies return air which is a target for conditioning (drawn indoor air) to the cold heat generating means (40) and supplies cooled supply air to inside the room.

The cold heat generating means (40) includes a humidification cooler (41) and a dehumidifier (42). Connected to the humidification cooler (41) are a water supplying means (4a) and the return air passageway (31) of the utilization system (30). The humidification cooler (41) directly sprays return air (indoor air) with water. The humidification cooler (41) cools the return air by evaporation latent heat of the water and generates saturated air.

The dehumidifier (42) is fed the saturated air from the humidification cooler (41). The dehumidifier (42) generates conditioned supply air by dehumidifying the saturated air to a preselected humidity. More specifically, the dehumidifier (42) includes a water vapor permeable membrane (4b). The dehumidifier (42) is divided by the water vapor permeable membrane (4b) into a dehumidification space and a low pressure space. The low pressure space is connected to the suction side of the compressor (50) through a water vapor passageway (21). On the other hand, the saturated air in the humidification cooler (41) is supplied to the dehumidification space. The saturated air is dehumidified by the difference in water vapor pressure created between the dehumidification space and the low pressure space, and cooled supply air of a given humidity is generated. The dehumidifier (42) supplies the cooled supply air to inside the room through the supply air passageway (32) of the utilization system (30).

The compressor (50) constitutes a pressure increasing means for increasing the pressure of water vapor separated in the dehumidifier (42) of the cold heat generating means (40). A discharge side of the compressor (50) is connected, through the water vapor passageway (22), to the moisture discharging device (60). The compressor (50) discharges compressed water vapor to the moisture discharging device (60).

The moisture discharging device (60) constitutes a moisture discharging means for discharging water vapor into outdoor air, and a discharge system (70) is connected to the moisture discharging device (60). More specifically, the moisture discharging device (60) includes a water vapor permeable membrane (61), and the inside of the moisture discharging device (60) is divided by the water vapor permeable membrane (61) into a high pressure space and a moisture discharge space. The high pressure space is connected to the discharge side of the compressor (50) through a water vapor passageway (22).

On the other hand, the discharge system (70) includes an introduction passageway (71) through which outdoor air (i.e., outside air) is taken into the moisture discharge space, and an exhaust air passageway (72) through which discharge air (humidified air) in the moisture discharge space is expelled outdoors. It is sufficient that the water vapor pressure of the high pressure space is higher than the water vapor pressure of the outdoor air. Therefore, the compressed water vapor migrates to the moisture discharge space by the difference in water vapor pressure created between the high pressure space and the moisture discharge space and then discharged into the outdoor air.

A driving shaft (51) of the compressor (50) is connected to an electric motor (52) and to a steam turbine (80). That is, the electric motor (52) converts electrical energy into mechanical power to drive the compressor (50). Further, the steam turbine (80) converts thermal energy into mechanical power to drive the compressor (50). The steam turbine (80) is fed water vapor from a boiler (81), and a water supplying means (82) is connected to the boiler (81).

The boiler (81) uses gas or the like as a fuel to heat water from the water supplying means (82) for generating high temperature water vapor to the steam turbine (80). The steam turbine (80) converts thermal energy into rotational power by expansion of the water vapor. In addition to driving the compressor (50) together with the steam turbine (80), the electric motor (52) is so constructed as to make up for power-deficiency of the steam turbine (80) or the like.

Further, a discharge side of the steam turbine (80) is connected, through a water vapor passageway (83), to the water vapor passageway (22) situated between the compressor (50) and the moisture discharging device (60). That is, water vapor discharged from the steam turbine (80) and water vapor discharged from the compressor (50) are mixed together and flow through the moisture discharging device (60).

Furthermore, the pressure of the steam turbine (80) is set below atmospheric pressure. For example, the pressure is set such that the boiling point is 54 degrees centigrade.

Operation

Next, the cooling operation of the above-described refrigeration system (10) will be described.

In the first place, the boiler (81) is fed water from the water supplying means (82) and generates high temperature water vapor by heating the water by using gas or the like as a fuel. This high temperature water vapor is supplied to the steam turbine (80), and the steam turbine (80) generates rotational power by expansion of the water vapor.

The compressor (50) is driven by the rotational power generated in the steam turbine (80). Further, the compressor (50) is driven both by the output of the steam turbine (80) and by the output of the electric motor (52). Furthermore, at the time when the steam turbine (80) is stopped, the compressor (50) is driven by the output of the electric motor (52) alone.

Figure 2:
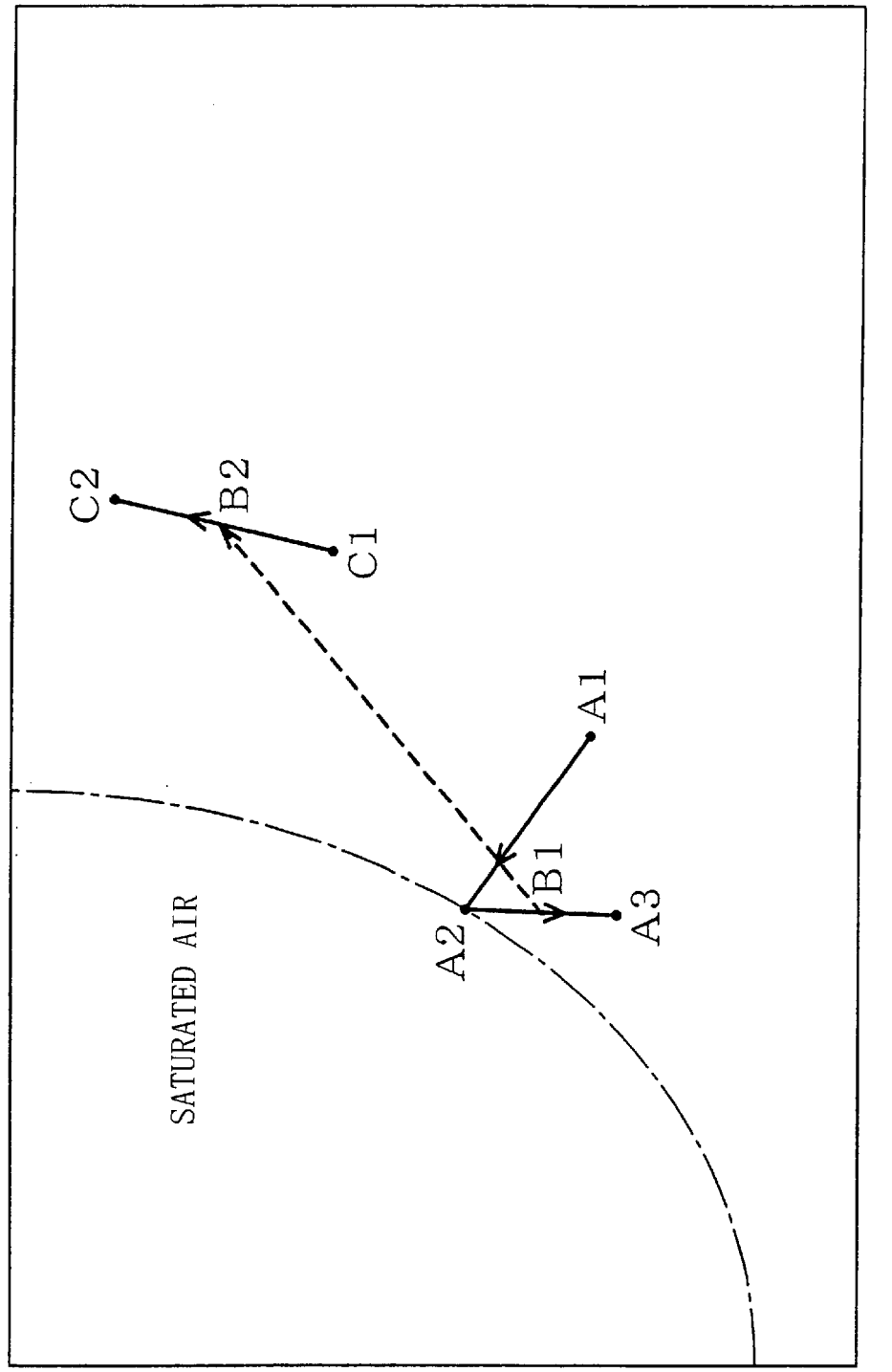
FIG. 2 is a psychrometric chart showing the cooling operation of the first embodiment.

On the other hand, in the utilization system (30), indoor air is drawn into the return air passageway (31). The indoor air is supplied, as return air, to the humidification cooler (41) of the cold heat generating means (40). This return air is for example in the state of A1 shown in FIG. 2. Since water has been supplied to the humidification cooler (41) from the water supplying means (4a), the return air is sprayed with the water. The return air is cooled by evaporation of the water and changes to saturated air in the state of A2.

The saturated air flows from the humidification cooler (41) into the dehumidification space of the dehumidifier (42). A low pressure space is formed through the water vapor permeable membrane (4b) in the dehumidifier (42) because the compressor (50) is being driven. Since the water vapor pressure of this low pressure space is lower than the water vapor pressure of the dehumidification space, water vapor contained in the saturated air passes through the water vapor permeable membrane (4b) and migrates into the low pressure space. As a result, the saturated air is dehumidified, thereby generating temperature- and humidity-conditioned supply air in the state of A3. This supply air is supplied, through the supply air passageway (32), to inside the room, and the room is cooled.

On the other hand, water vapor in the low pressure space of the moisture discharging device (60) is drawn into the compressor (50) and compressed there. That is, the pressure of the water vapor increases from B1 up to B2 (see FIG. 2). This compressed water vapor flows in the moisture discharging device (60). At that time, the compressed water vapor is mixed with water vapor discharged from the steam turbine (80) and thereafter flows into the high pressure space of the moisture discharging device (60).

Outdoor air flows into the moisture discharge space of the moisture discharging device (60) from the introduction passageway (71). The water vapor pressure of the high pressure space of the moisture discharging device (60) is higher than the water vapor pressure of the moisture discharge space, so that water vapor passes through the water vapor permeable membrane (61) and migrates into the moisture discharge space. As a result, water vapor from the compressor (50) and water vapor from the steam turbine (80) are discharged into the outdoor air. That is, the outdoor air in the state of C1 shown in FIG. 2 absorbs the water vapor and changes to discharge air in the state of C2. This discharge air, after passing through the exhaust air passageway (72), is expelled outdoors. This water vapor cycle is repeatedly carried out and the room is cooled.

Figure 3:
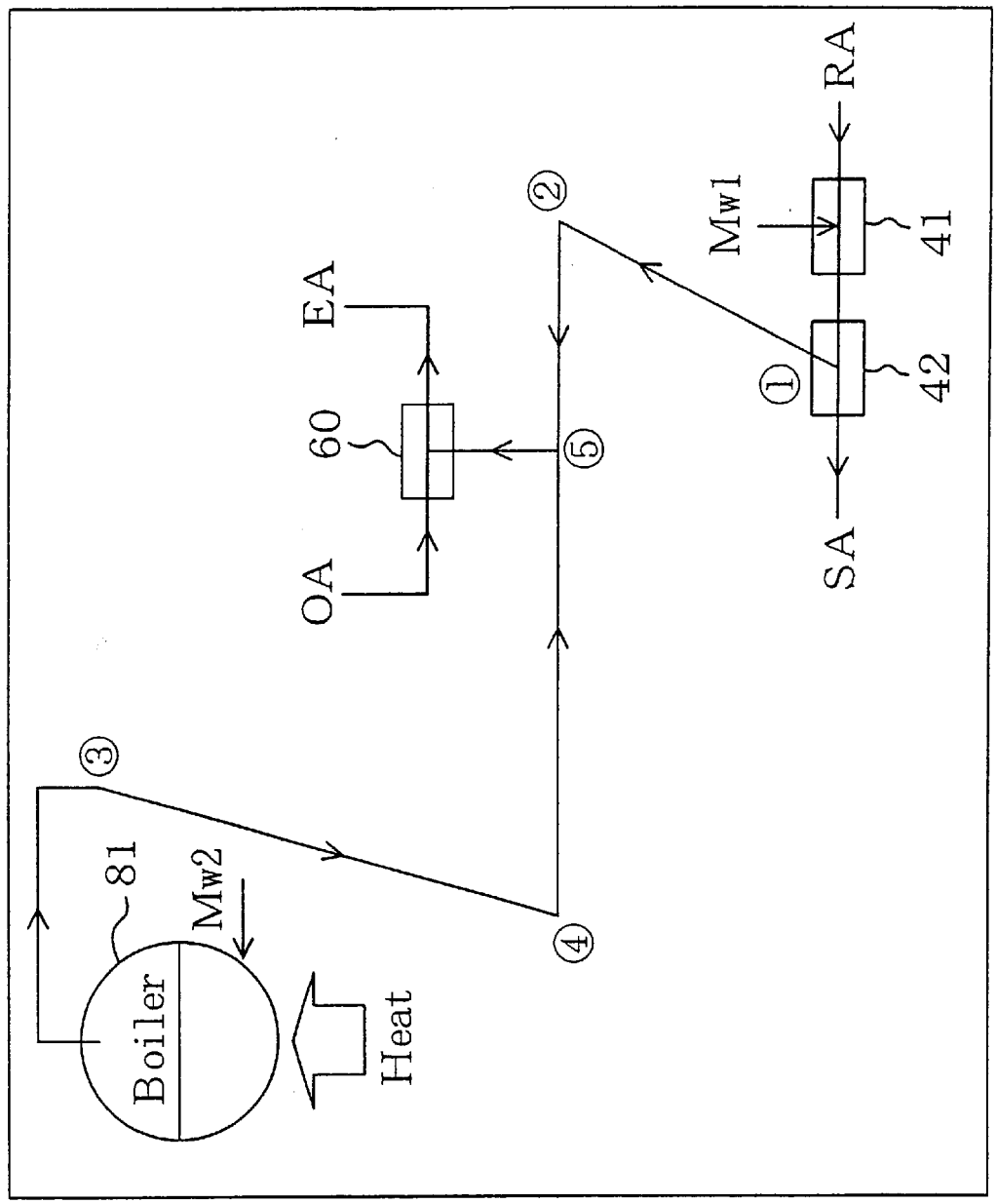
FIG. 3 is a state describing diagram showing the cooling operation of the first embodiment.

Based on a state diagram shown in FIG. 3, the migration of water vapor will be described in detail.

In the humidification cooler (41), water of Mw1 is supplied to indoor return air RA, and water vapor of Mw1 at (1) is collected in the compressor (50) from the dehumidifier (42). And, supply air SA is supplied to inside the room and, at the same time, the water vapor is compressed by the compressor (50) up to (2).

On the other hand, heat is applied to the boiler (81) and, in addition, water of Mw2 is supplied to the boiler (81). Water vapor at (3) is supplied to the steam turbine (80) from the boiler (81). In the boiler (81), water vapor of Mw2 at (3) expands up to (4). Water vapor compression from (1) up to (2) by the compressor (50) is carried out by power generated by expansion from (3) up to (4).

Thereafter, water vapor of Mw2 from the steam turbine (80) and water vapor of Mw1 from the compressor (50) merge together. And, water vapor at (5) is discharged to outdoor air OA in the moisture discharging device (60) and then is discharged outdoors as discharge air EA.

During the above-described cooling mode, for example, heat that is applied to the boiler (81) is at 250 degrees centigrade; the water vapor pressure on the suction side of the steam turbine (80) is 15.0 kPa; and the water vapor pressure on the discharge side of the steam turbine (80) is 3.4 kPa. Further, the water vapor pressure on the suction side of the compressor (50) is 1.3 kPa and the water vapor pressure on the discharge side of the compressor (50) is the same as that of the steam turbine (80), i.e., 3.4 kPa.

In such a case, since the water vapor pressure on the suction side of the steam turbine (80) is 15.0 kPa, the boiling point is 54 degrees centigrade. Especially, thermal energy at 250 degrees centigrade is 46.65 kW of which 40.62 kW is an amount of latent heat for causing water to undergo evaporation and 6.03 kW is an amount of sensible heat for superheating water vapor.

Effects of the First Embodiment

As described above, in accordance with the present embodiment, thermal energy is utilized to drive the compressor (50). Therefore, various types of energies can be utilized to drive the compressor (50), and it is possible to improve energy efficiency.

Further, cold heat is obtained by evaporation latent heat of water. Therefore, it is possible to perform air conditioning without causing any environmental problems.

Furthermore, water vapor from the steam turbine (80) is discharged through the water vapor permeable membrane (61) of the moisture discharging device (60), thereby making it possible to increase the expansion ratio, and the compressor (50) can be driven with a less amount of water vapor.

Further, water vapor from the compressor (50) is discharged through the water vapor permeable membrane (61) of the moisture discharging device (60), the compressor (50) is only required to increase the pressure of discharging water vapor above the water vapor pressure of outside air, and the amount of increasing pressure can be made smaller in comparison with cases where water is caused to condense. As a result, it becomes possible to reduce the input of the compressor (50). At the same time, it is possible to increase the expansion ratio of the steam turbine (80), thereby making it possible to improve the output of the steam turbine (80).

Furthermore, the cold heat generating means (40) is made up of the humidification cooler (41) and the dehumidifier (42), thereby making it possible to separately control the temperature and the humidity of air to be conditioned, and it becomes possible to generate accurately conditioned air.

Further, the dehumidifier (42) is provided with the water vapor permeable membrane (4b), and it is only required that the suction pressure of the compressor (50) be made lower than the water vapor pressure of return air. This makes it possible to reduce the input of the compressor (50).

Embodiment 2

Next, a second embodiment of the present invention will be described in detail with reference to the drawings.

Figure 4:
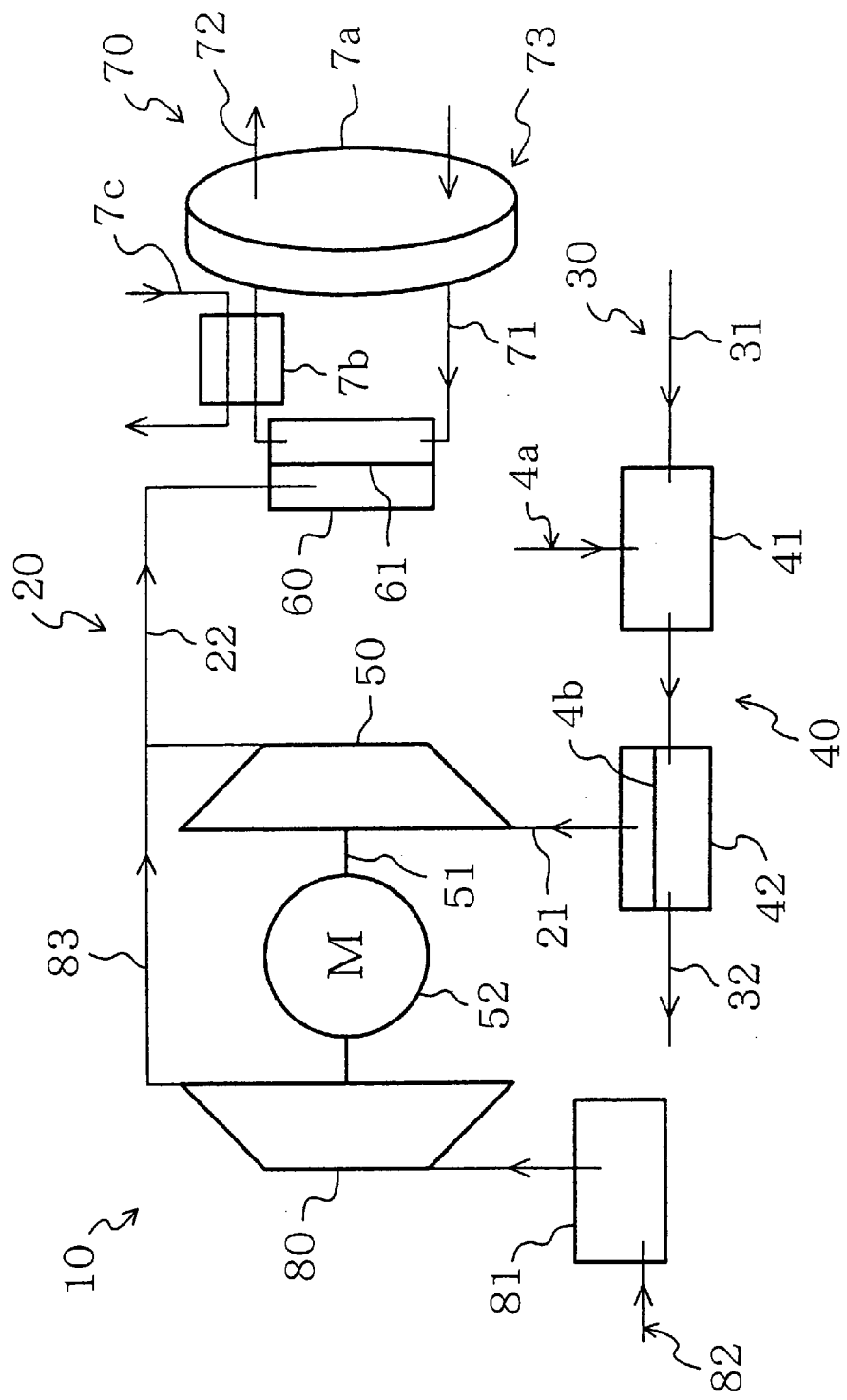
FIG. 4 is a schematic arrangement diagram showing a refrigeration system according to a second embodiment of the present invention.

As shown in FIG. 4, a refrigeration system (10) of the present embodiment is a refrigeration system in which the discharging system (70) is provided with a humidity controlling means (73).

The humidity controlling means (73) has a rotor member (7a) disposed between the introduction passageway (71) and the exhaust air passageway (72). The humidity conditioning means (73) is configured in the same way as a so-called rotary dehumidifier. The rotor member (7a) is shaped like a disk and constructed so that air is allowed to pass through the rotor member (7a) in the direction of the thickness thereof. The rotor member (7a), which is provided with a solid adsorbent for adsorbing moisture, constitutes a humidity medium by which passing air is brought into contact with the solid adsorbent. The solid adsorbent is mainly composed of a porous inorganic compound.

Outdoor air in the introduction passageway (71) passes through the rotor member (7a), and moisture contained in the outdoor air is adsorbed in the solid adsorbent of the rotor member (7a). This dehumidifies the outdoor air.

On the other hand, discharge air in the exhaust air passageway (72) passes through the rotor member (7a), and the moisture adsorbed in the solid adsorbent of the rotor member (7a) is removed and discharged into the discharge air. Because of this, the solid adsorbent is regenerated.

That is, the rotor member (7a) is rotationally driven, and a portion thereof, which has absorbed moisture from the outdoor air, moves and discharges the moisture into discharge air, as a result of which the moisture is removed from the solid adsorbent. In this way, the solid adsorbent is regenerated. This operation is repeatedly carried out for continuous outdoor air dehumidification.

Further, disposed in the exhaust air passageway (72) between the moisture discharging device (60) and the rotor member (7a) is a heat exchanger (7b). Connected to the heat exchanger (7b) is a medium passageway in which high temperature thermal medium flows. The thermal medium and the discharge air exchange heat, and the discharge air is heated. This discharge air flows though the rotor member (7a) and heat held in the thermal medium is utilized for the regeneration of the solid adsorbent of the rotor member (7a). Various types of waste heats such as fuel cell waste heat may be used to heat the thermal medium.

Figure 5:
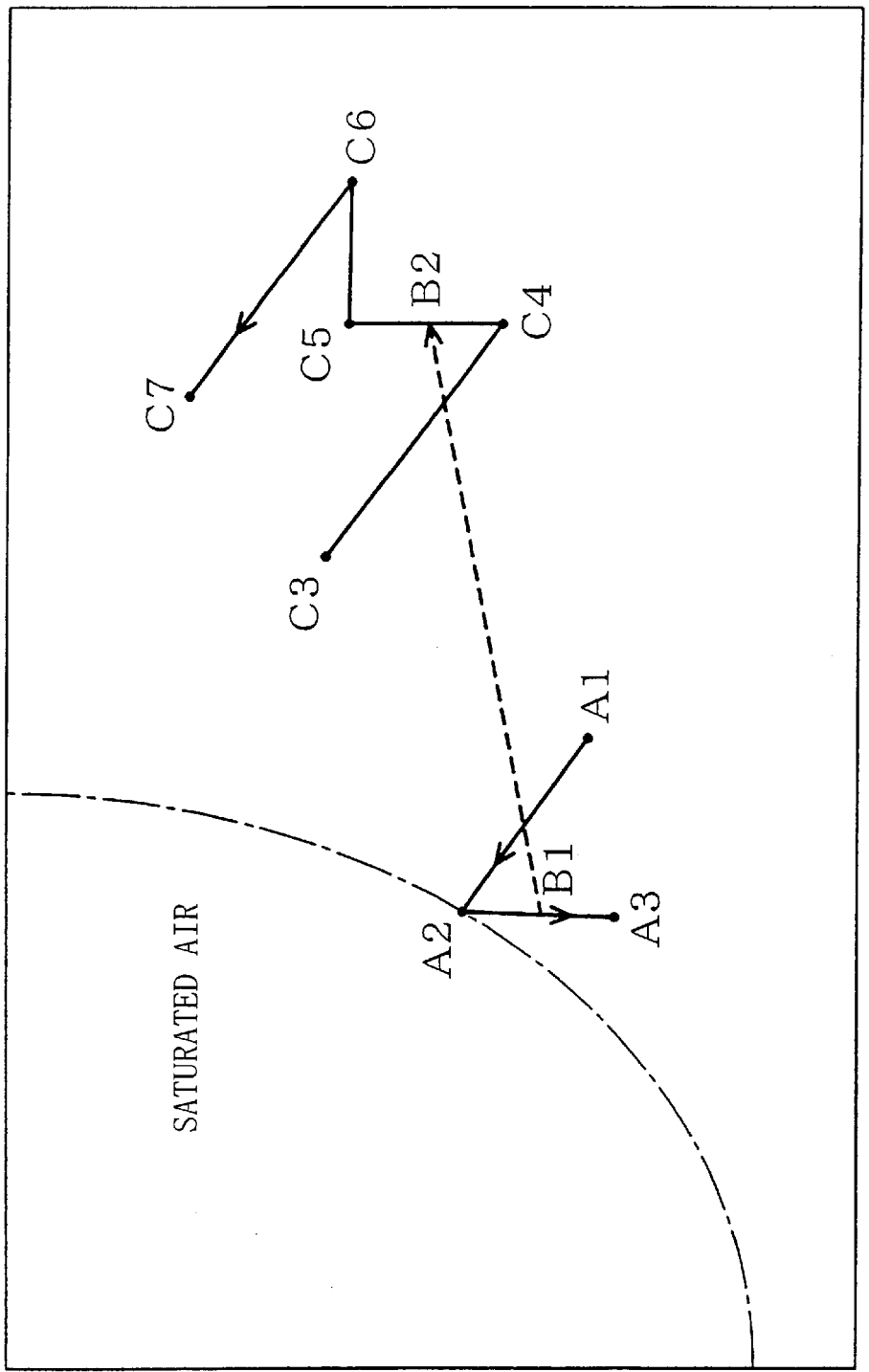
FIG. 5 is a psychrometric chart showing the cooling operation of the second embodiment.

That is, as shown in FIG. 5, outdoor air that is taken in the introduction passageway (71) is in the state of C3. This outdoor air, after passing through the rotor member (7a), is dehumidified and enters the state of C4. This dehumidified outdoor air absorbs therein water vapor in the moisture discharging device (60) and enters the state of C5. The discharge air, which has absorbed water vapor, flows through the exhaust air passageway (72), is heated in the heat exchanger (7b), and enters the state of C6. The heated discharge air passes through the rotor member (7a) where it is further dehumidified, enters the state of C7, and is discharged outdoors.

Accordingly, in accordance with the present embodiment, the water vapor pressure of outdoor air that is introduced into the moisture discharging device (60) can be lowered by the humidity controlling means (73), which makes it possible to further reduce the input of the compressor (50). As a result, it is possible to provide a further improved efficiency.

Further, in the heat exchanger (7b) of the humidity controlling means (73), various types of waste heats can be utilized to heat discharge air, thereby making it possible to make effective utilization of energy. The other arrangements, operation, and effects of the second embodiment are the same as those described in the first embodiment.

Embodiment 3

Next, a third embodiment of the present invention will be described in detail with reference to the drawings.

Figure 6:
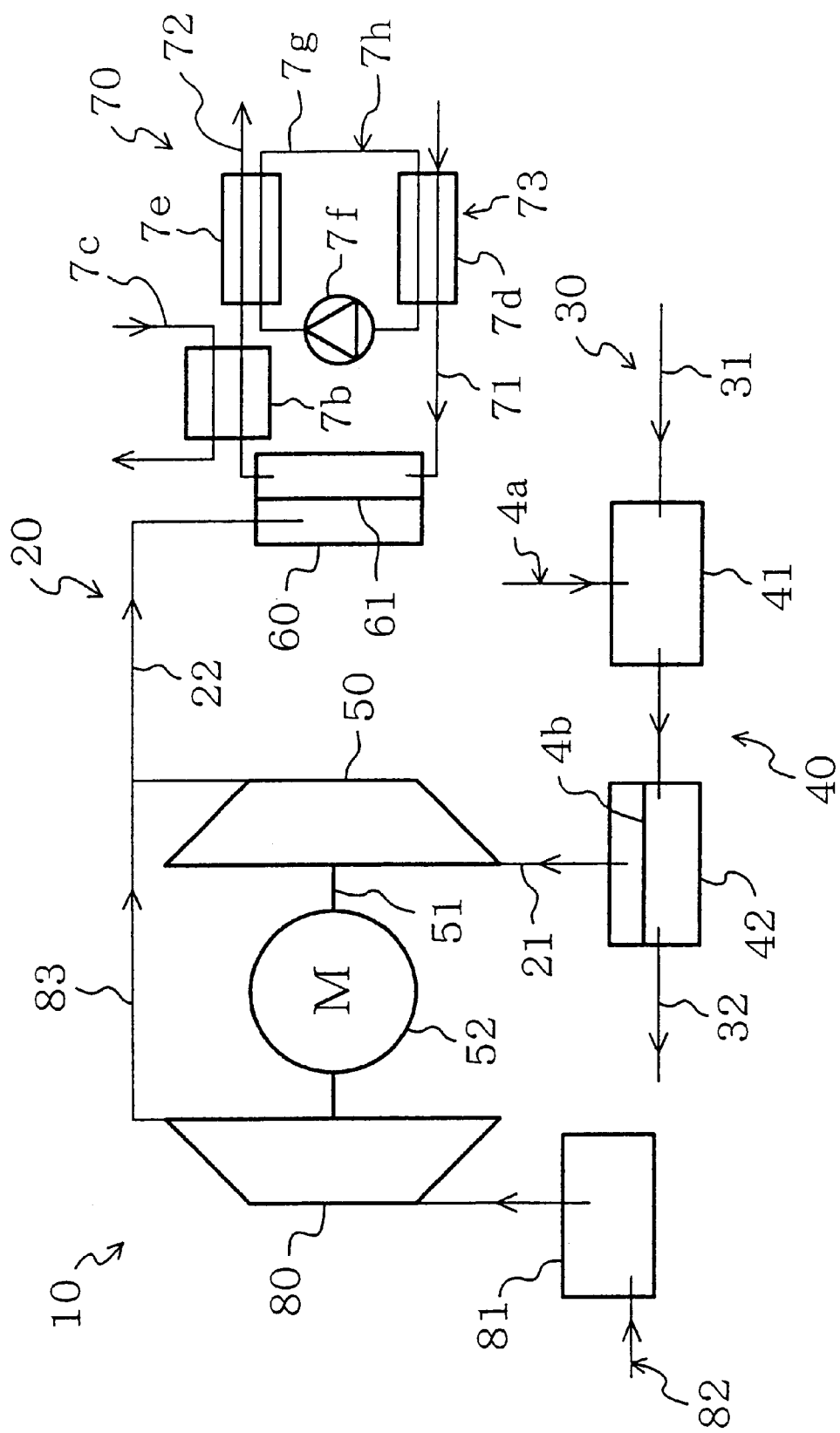
FIG. 6 is a schematic arrangement diagram showing a refrigeration system according to a third embodiment of the present invention.

As shown in FIG. 6, in the present embodiment the humidity controlling means (73) of the second embodiment using a solid adsorbent is replaced by a humidity controlling means (73) using a liquid absorbent.

That is, the humidity controlling means (73) of the present embodiment comprises a circulation circuit (7h) constructed by connecting together a moisture absorbing section (7d), a moisture discharging section (7e), and a pump (7f) in that order by a liquid pipe (7g). The circulation circuit (7h) is charged with a water solution of metal halide as a liquid absorbent. Examples of this type of metal halide are LiCl, LiBr, $CaCl_2$, and so forth. The liquid absorbent may be a water solution of hydrophilic organic compound. Examples of this type of hydrophilic organic compound are ethylene glycol, glycerin, water absorbable resin, and so forth.

The moisture absorbing section (7d) is situated midway along the introduction passageway (71). The moisture absorbing section (7d) is divided by a hydrophobic porous membrane through which moisture can pass, into an air side space and a liquid side space. The introduction passageway (71) is connected to the air side space in which outdoor air flows. On the other hand, the liquid pipe (7g) is connected to the liquid side space in which the liquid absorbent flows. In the moisture absorbing section (7d), the outdoor air and the liquid absorbent are brought into indirect contact with each other through the hydrophobic porous membrane, and moisture contained in the outdoor air is absorbed in the liquid absorbent. In this way, the outdoor air is dehumidified.

The moisture discharging section (7e), which is identical in configuration with the moisture absorbing section (7d), is situated midway along the exhaust air passageway (72). That is, the moisture discharging section (7e) is provided with a hydrophobic porous membrane, wherein discharge air from the exhaust air passageway (72) flowing in the air side space and the liquid absorbent from the liquid pipe (7g) flowing in the liquid side space are brought into indirect contact with each other through the hydrophobic porous membrane. The liquid absorbent is heated by the discharge air and its moisture content is removed, and the moisture migrates into the discharge air. In this way, the liquid absorbent is regenerated.

Further, the liquid absorbent is circulated through the circulation circuit (7h) by the pump (7f), and outdoor air dehumidification is carried out continuously.

In each of the moisture absorbing section (7d) and the moisture discharging section (7e), air and a liquid absorbent are brought into indirect contact with each other through for example the moisture permeable membrane (4f). However, air and a liquid absorbent may be brought into direct contact with each other. The other arrangements, operation, effects of the third embodiments are the same as those described in the first and second embodiments.

Embodiment 4

Next, a fourth embodiment of the present invention will be described in detail by making reference to the drawings.

Figure 7:
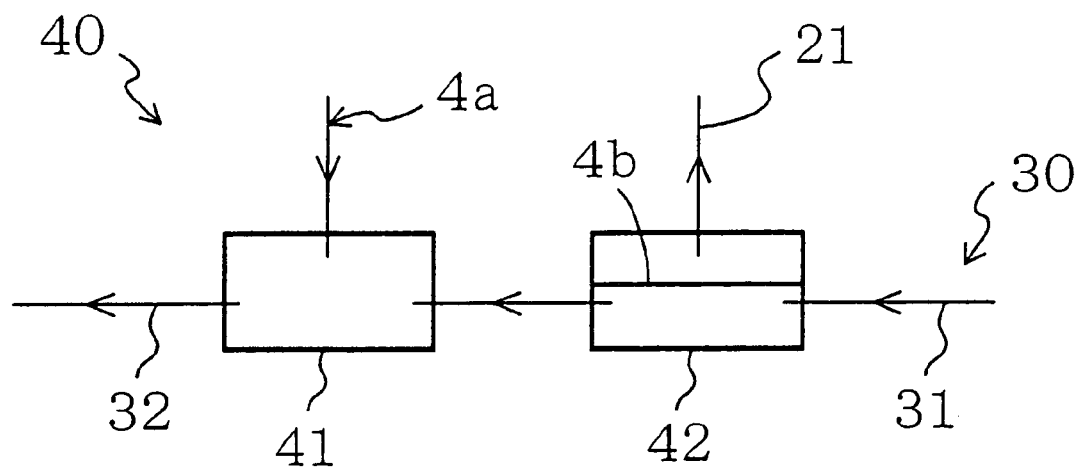
FIG. 7 is a schematic arrangement diagram showing a cold heat generating means according to a fourth embodiment of the present invention.
Figure 8:
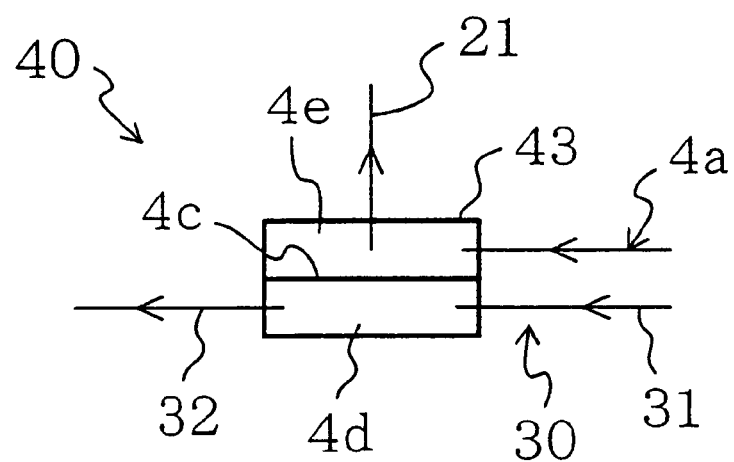
FIG. 8 is a schematic arrangement diagram showing a cold heat generating means according to a fifth embodiment of the present invention.

In the cold heat generating means (40) of the first embodiment, the humidification cooler (41) and the dehumidifier (42) are disposed in that order. On the other hand, in the cold heat generating means (40) of the present embodiment, the dehumidifier (42) and the humidification cooler (41) are disposed in that order opposite to the order in which they are disposed in the first embodiment, as shown in FIG. 7.

Accordingly, water vapor contained in return air flowing through the return air passageway (31) is removed in the dehumidifier (42). Then, the water vapor is drawn into the compressor (50). Thereafter, the return air flows in the humidification cooler (41) where the return air is sprayed with water from the water supplying means (4a) and cooled. As a result, temperature- and humidity-conditioned supply air is generated. This supply air is supplied indoors. The other arrangements, operation, and effects of the fourth embodiment are the same as those described in the first embodiment.

Embodiment 5

Next, a fifth embodiment of the present invention will be described in detail with reference to the drawings.

The cold heat generating means (40) of the first embodiment is made up of the humidification cooler (41) and the dehumidifier (42). On the other hand, the cold heat generating means (40) of the present embodiment is formed by an evaporation cooler (43).

The evaporation cooler (43) includes a heat-transfer member (4c) and its inside is divided into an air side space (4d) and an evaporation side space (4e). Connected to the air side space (4d) are the return air passageway (31) and the supply air passageway (32) of the utilization system (30). On the other hand, connected to the evaporation side space (4e) are the water supplying means (4a) and the water vapor passageway (21).

Water, which has been supplied to the evaporation side space (4e), evaporates in the evaporation side space (4e), and cold heat is generated. The water vapor is drawn into the compressor (50). Meanwhile, the generated cold heat is transferred to return air through the heat-transfer member (4c), whereby the return air is cooled and changes to conditioned supply air. This supply air is delivered to inside the room.

Accordingly, in accordance with the present embodiment, water will never be mixed with the return air. Therefore, he present embodiment is applicable to cases where strict moisture control is essential. The other arrangements, operation, and effects of the present embodiment are the same as those described in the first embodiment.

Embodiment 6

Next, a sixth embodiment of the present invention will be described in detail by making reference to the drawings.

Figure 9:
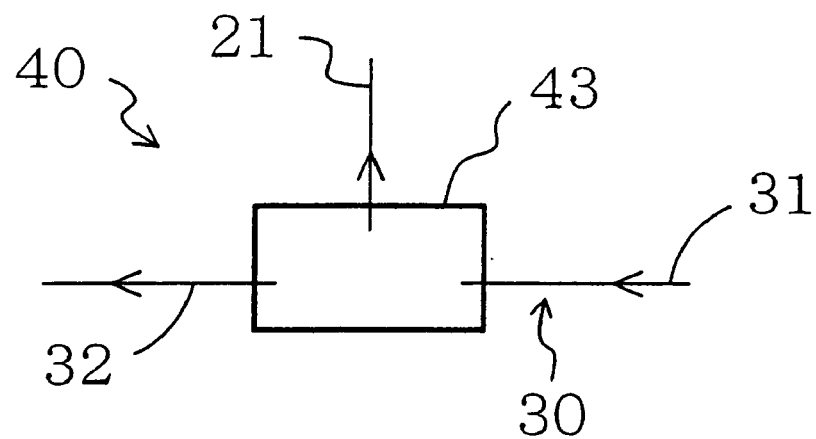
FIG. 9 is a schematic arrangement diagram showing a cold heat generating means according to a sixth embodiment of the present invention.

As shown in FIG. 9, the cold heat generating means (40) of the present embodiment is a cold heat generating means which generates cooling water, unlike the cold heat generating means (40) of the first embodiment which generates cooling air.

The cold heat generating means (40) of the present embodiment includes an evaporation cooler (43). Connected to the evaporation cooler (43) are a water supplying passageway (33) and a cold heat passageway (34) of the utilization system (30). In addition, the water vapor passageway (21) is connected to the evaporation cooler (43). The inside of the evaporation cooler (43) is a low pressure space in which water is caused to undergo direct evaporation.

For example, return water, after it was used to cool a target for cooling, flows through the water supplying passageway (33). This return water flows into the evaporation cooler (43). A part of the return air evaporates and cooling water is generated. This cooling water flows through the cold heat passageway (34) and is supplied to a target for cooling. In this way, the target is cooled. Meanwhile, the water vapor flows through the water vapor passageway (21) and is drawn into the compressor (50).

Accordingly, in the present embodiment, it is possible to cool water, thereby making it possible to provide a high-efficiency, chiller type refrigeration system (10). The other arrangements, operation, effects of the present embodiment are the same as those described in the first embodiment.

Further, in the present embodiment, cooling water is generated. Alternatively, ice may be generated. In this case, a high-efficiency ice machine is provided.

Embodiment 7

Next, a seventh embodiment of the present invention will be described in detail by making reference to the drawings.

Figure 10:
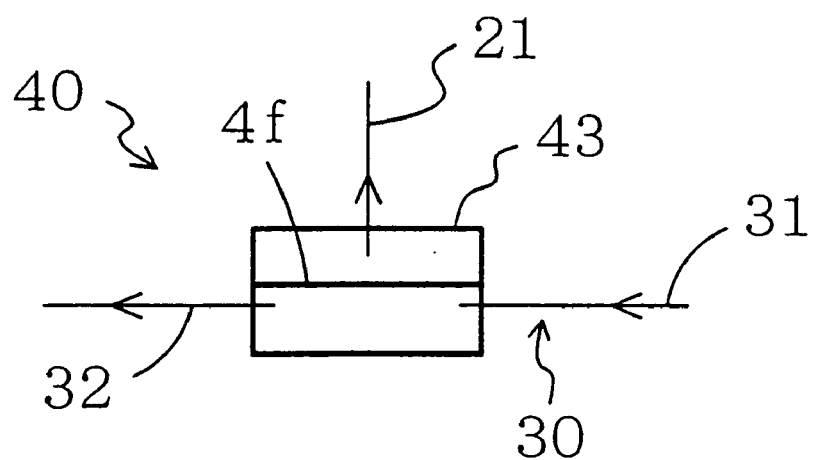
FIG. 10 is a schematic arrangement diagram showing a cold heat generating means according to a seventh embodiment of the present invention.

As shown in FIG. 10, unlike the cold heat generating means (40) of the sixth embodiment which causes water to undergo direct evaporation, in the cold heat generating means (40) of the present embodiment water is caused to evaporate through a moisture permeable membrane (4f).

That is, the cold heat generating means (40) of the present embodiment includes an evaporation cooler (43). This evaporation cooler (43) is provided with the moisture permeable membrane (4f), and its inside is divided into a low pressure space and a cooling space. Connected to the low pressure space is the water vapor passageway (21). On the other hand, connected to the cooling space are the water supplying passageway (33) and the cold heat passageway (34) of the utilization system (30).

Water flows into the evaporation cooler (43) from the water supplying passageway (33). A part of the water evaporates and passes through the moisture permeable membrane (4f) and migrates into the low pressure space, and cooling water is generated. This cooling water flows through the cold heat passageway (34). Meanwhile, the water vapor flows through the water vapor passageway (21) and is drawn into the compressor (50).

Accordingly, in the present embodiment, water is caused to evaporate through the moisture permeable membrane (4f), thereby making it possible to prevent scale from flowing into the compressor (50). The other arrangements, operation, effects of the present embodiment are the same as those described in the first and sixth embodiments.

Other Embodiments

In the first embodiment, the steam turbine (80) serves as a prime mover. Alternatively, a gas turbine may be used as the prime mover (80).

The pressure increasing means is not limited to the compressor (50). Any other pressure increasing means can be used as long as it can compress water vapor to an increased pressure.

Further, as one embodiment of the present invention, there is one in which the electric motor (52) may not be required.

Furthermore, as the water vapor that is supplied to the steam turbine (80), an excess of water vapor produced in a factory or the like may be utilized.

Further, in the first embodiment, the boiler (81) uses a gas fuel or the like. Alternatively, various types of waste heats may be utilized to generate high temperature water vapor. This makes it possible to utilize fuel cell (co-generation system) waste heat or the like, thereby further improving efficiency.

In the first embodiment, the boiler (81) uses a gas fuel or the like. Alternatively, in addition to the provision of the boiler (81), gas combustion, an electric heater, or a superheating means such as pyrogenetic reaction may be provided. That is, in the water vapor generation (for latent heat), various types of waste heats can be utilized in the boiler (81), and in the following water vapor superheating (for sensible heat), a superheating means using gas combustion or the like may be used. In this case, the amount of heat for sensible heat is small, thereby making it possible to improve efficiency.

Further, water vapor exhausted from the steam turbine (80) may be discharged into the atmospheric air. That is, when the discharge pressure of the steam turbine (80) is above atmospheric pressure, water vapor is discharged directly into the atmospheric air. This makes it possible to simplify the arrangement of the whole system.

Furthermore, an arrangement may be made in which sensible heat of high temperature water vapor discharged from the compressor (50) is collected, and the heat collected is utilized for the generation of water vapor that is supplied to the steam turbine (80) or for the superheating of water vapor. This makes it possible to further improve efficiency because of such heat collection.

Further, the humidification cooler (41) of the first embodiment directly sprays water. An alternative arrangement may be made in which the humidification cooler (41) is provided with a moisture permeable membrane and water is evaporated and passes through the moisture permeable membrane. This prevents the occurrence of scale or the like.

INDUSTRIAL APPLICABILITY

As described above, the refrigeration systems of the present invention are useful for cases where cold heat is generated by direct water evaporation. Especially, the refrigeration systems of the present invention are suitable for air conditioning systems for providing room cooling.

What is claimed is:

1. A refrigeration system in which water is evaporated to generate cold heat and water vapor produced is increased in pressure by pressure increasing means (50) and then discharged,
wherein said pressure increasing means is driven at least by mechanical power derived from thermal energy;
the refrigeration system further comprises:
cold heat generating means in which water serves as a refrigerant; said water is evaporated to generate cold heat; and water vapor produced is drawn into said pressure increasing means;
moisture discharging means for discharging water vapor increased in pressure by said pressure increasing means;
a prime mover for generating mechanical power from thermal energy to drive said pressure increasing means;
wherein said cold heat generating means comprises a humidification cooler which supplies water to air to be conditioned so that said air is cooled, and a dehumidifier which dehumidifies said air cooled by said humidification cooler, and
wherein said dehumidifier includes a water vapor permeable membrane allowing water vapor to pass therethrough so that water vapor can be removed because of a difference in water vapor pressure created between partition spaces divided by said water vapor permeable membrane.

2. A refrigeration system in which water is evaporated to generate cold heat and water vapor produced is increased in pressure by pressure increasing means and then discharged,
wherein said pressure increasing means is driven at least by mechanical power derived from thermal energy;
the refrigeration system further comprises:
cold heat generating means in which water serves as a refrigerant; said water is evaporated to generate cold heat; and water vapor produced is drawn into said pressure increasing means;
moisture discharging means for discharging water vapor increased in pressure by said pressure increasing means;
a prime mover for generating mechanical power from thermal energy to drive said pressure increasing means;
wherein said cold heat generating means includes a dehumidifier which dehumidifies air to be conditioned, and a humidification cooler which supplies water to said air dehumidified by said dehumidifier so that said air is cooled, and
wherein said dehumidifier includes a water vapor permeable membrane allowing water vapor to pass therethrough so that water vapor can be removed because of a difference in water vapor pressure created between partition spaces divided by said water vapor permeable membrane.

3. A refrigeration system in which water is evaporated to generate cold heat and water vapor produced is increased in pressure by pressure increasing means and then discharged,
wherein said pressure increasing means is driven at least by mechanical power derived from thermal energy;
the refrigeration system further comprises:
cold heat generating means in which water serves as a refrigerant; said water is evaporated to generate cold heat; and water vapor produced is drawn into said pressure increasing means;
moisture discharging means for discharging water vapor increased in pressure by said pressure increasing means;
a prime mover for generating mechanical power from thermal energy to drive said pressure increasing means;
wherein said cold heat generating means includes an evaporation cooler which generates cooling water by water evaporation, and
wherein said evaporation cooler includes a moisture permeable membrane allowing water vapor to pass therethrough so that water evaporates and passes through said moisture permeable membrane (4*f*) to a low pressure space.

4. A refrigeration system in which water is evaporated to generate cold heat and water vapor produced is increased in pressure by pressure increasing means and then discharged,
wherein said pressure increasing means is driven at least by mechanical power derived from thermal energy;
the refrigeration system further comprises:
cold heat generating means in which water serves as a refrigerant; said water is evaporated to generate cold heat; and water vapor produced is drawn into said pressure increasing means;
moisture discharging means for discharging water vapor increased in pressure by said pressure increasing means;
a prime mover for generating mechanical power from thermal energy to drive said pressure increasing means;
wherein the cold heat generating means includes an evaporation cooler which generates ice by water evaporation, and
wherein said evaporation cooler includes a moisture permeable membrane allowing water vapor to pass therethrough so that water evaporates and passes through said moisture permeable membrane to a low pressure space.

5. The refrigeration system according to any one of claims 1, 2, 3, and 4, further comprising:
an electric motor which generates mechanical power from electrical energy to drive said pressure increasing means together with said prime mover.

6. The refrigeration system according to any one of claims 1, 2, 3, and wherein said prime mover is a steam turbine.

7. The refrigeration system of claim 6, wherein said steam turbine (80) utilizes an excess of water vapor.

8. The refrigeration system of claim 6 further comprising:
a boiler (81) which utilizes waste heat to generate a supply of water vapor to said steam turbine (80).

9. The refrigeration system of claim 6 further comprising:
a boiler (81) which utilizes waste heat to generate a supply of water vapor to said steam turbine (80), and
superheating means which superheats water vapor generated in said boiler (81).

10. The refrigeration system of either claim 6 or claim 9, wherein the pressure of said boiler (81) is set below atmospheric pressure.

11. The refrigeration system of claim 6, wherein water vapor discharged from said steam turbine (80) is mixed with water vapor discharged from said pressure increasing means (50) and then discharged from said moisture discharging means (60).

12. The refrigeration system of claim 6, wherein sensible heat produced in said pressure increasing means (50) is collected and said collected heat is utilized to generate a supply of water vapor to said steam turbine (80) or to superheat water vapor.

13. The refrigeration system of claim 6, wherein said moisture discharging means (60) includes a water vapor permeable membrane (61) allowing water vapor to pass therethrough so that water vapor can be discharged into the atmospheric air because of a difference in water vapor pressure created between partition spaces divided by said water vapor permeable membrane (61).

14. The refrigeration system of either claim 1 or 2, wherein said humidification cooler includes a moisture permeable membrane allowing water vapor to pass therethrough so that water evaporates and then passes through said moisture permeable membrane to humidify and cool air.

15. The refrigeration system according to any one of claims 1, 2, 3, and 4, further comprising:
 humidity controlling means which controls the humidity of outside air whose moisture content is discharged by said moisture discharging means.

16. The refrigeration system of claim 15, wherein said humidity controlling means (73) includes a heat exchanger (7b) which increases the temperature of outside air by utilizing waste heat.

* * * * *